(12) United States Patent
Ito et al.

(10) Patent No.: US 9,933,676 B2
(45) Date of Patent: Apr. 3, 2018

(54) LIQUID CRYSTAL PANEL AND ACTIVE MATRIX SUBSTRATE USED THEREFOR

(71) Applicant: Sharp Kabushiki Kaisha, Osaka-shi, Osaka (JP)

(72) Inventors: Kazuatsu Ito, Osaka (JP); Tadayoshi Miyamoto, Osaka (JP); Seiichi Uchida, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 170 days.

(21) Appl. No.: 15/100,700

(22) PCT Filed: Nov. 28, 2014

(86) PCT No.: PCT/JP2014/081558
§ 371 (c)(1),
(2) Date: Jun. 1, 2016

(87) PCT Pub. No.: WO2015/083639
PCT Pub. Date: Jun. 11, 2015

(65) Prior Publication Data
US 2016/0306247 A1 Oct. 20, 2016

(30) Foreign Application Priority Data

Dec. 2, 2013 (JP) ................................ 2013-249387

(51) Int. Cl.
*G02F 1/1362* (2006.01)
*G02F 1/1368* (2006.01)
(Continued)

(52) U.S. Cl.
CPC ...... *G02F 1/136286* (2013.01); *G02F 1/1339* (2013.01); *G02F 1/1368* (2013.01);
(Continued)

(58) Field of Classification Search
CPC ............. G02F 1/1339; G02F 1/134309; G02F 1/136213; G02F 1/136286;
(Continued)

(56) References Cited

U.S. PATENT DOCUMENTS

2003/0063233 A1    4/2003   Takagi
2009/0141203 A1*   6/2009   Son ................... G02F 1/136213
                                                       349/39

(Continued)

FOREIGN PATENT DOCUMENTS

JP       10-206823 A      8/1998
JP       2000-338523 A    12/2000
(Continued)

OTHER PUBLICATIONS

Official Communication issued in International Patent Application No. PCT/JP2014/081558, dated Feb. 24, 2015.

*Primary Examiner* — Huyen Ngo
(74) *Attorney, Agent, or Firm* — Keating & Bennett, LLP (57) ABSTRACT

A liquid crystal panel (100) includes a pair of substrates (10, 30); a liquid crystal layer (40) provided between the pair of substrates; and a sealing member (42) provided so as to surround the liquid crystal layer. A plurality of pixels (P1, P2) are provided in a matrix in a region surrounded by the sealing member. Each of the plurality of pixels includes an oxide semiconductor TFT (5) provided in one substrate (10) of the pair of substrates; and a pixel electrode (19) provided in the one substrate and connected with the oxide semiconductor TFT. Each of the plurality of pixels is configured such that when the oxide semiconductor TFT is switched from an on-state to an off-state, a level of a voltage to be applied to the liquid crystal layer by use of the pixel electrode is shifted in a negative direction by a pull-in voltage $\Delta Vd$. A pull-in voltage $\Delta Vd1$ in a first pixel (P1) among the plurality of (Continued)

pixels is lower than a pull-in voltage $\Delta Vd2$ in a second pixel (P2) located farther from the sealing member than the first pixel.

9 Claims, 9 Drawing Sheets

(51) Int. Cl.
    *G02F 1/1339*      (2006.01)
    *G02F 1/1343*      (2006.01)
    *G02F 1/1333*      (2006.01)
    *G09G 3/36*      (2006.01)

(52) U.S. Cl.
CPC .. *G02F 1/134309* (2013.01); *G02F 1/136213* (2013.01); *G02F 2001/133388* (2013.01); *G02F 2201/123* (2013.01); *G02F 2202/10* (2013.01); *G09G 3/3648* (2013.01); *G09G 2320/0219* (2013.01); *G09G 2320/0247* (2013.01)

(58) Field of Classification Search
CPC ... G02F 2001/133388; G02F 2201/123; G02F 2202/10; G09G 2320/0219; G09G 3/3648
See application file for complete search history.

(56) References Cited

U.S. PATENT DOCUMENTS

| 2012/0138922 | A1 | 6/2012 | Yamazaki et al. | |
|---|---|---|---|---|
| 2013/0188110 | A1 | 7/2013 | Miyamoto | |
| 2014/0367677 | A1* | 12/2014 | Miyamoto | H01L 29/7869 257/43 |
| 2015/0255491 | A1* | 9/2015 | Uchida | H01L 27/1225 349/43 |

FOREIGN PATENT DOCUMENTS

| JP | 2007-121485 A | | 5/2007 | |
|---|---|---|---|---|
| JP | 2012-134475 A | | 7/2012 | |
| KR | 20130029771 A | * | 3/2013 | ............... G09G 3/36 |
| WO | 2012/032749 A1 | | 3/2012 | |

* cited by examiner

LIQUID CRYSTAL PANEL AND ACTIVE MATRIX SUBSTRATE USED THEREFOR

TECHNICAL FIELD

The present invention relates to a liquid crystal panel including an oxide semiconductor TFT, and to an active matrix substrate.

BACKGROUND ART

An active matrix substrate used for a liquid crystal display device or the like includes a switching element such as a thin film transistor (hereinafter, referred to as a "TFT") for each of pixels. Conventionally, a TFT including an active layer formed of an amorphous silicon film (hereinafter, such a TFT will be referred to as an "amorphous silicon TFT") or a TFT including an active layer formed of a polycrystalline silicon film (hereinafter, such a TFT will be referred to as a "polycrystalline silicon TFT") is widely used as such a switching element.

Recently, there has been an attempt to use a material other than amorphous silicon or polycrystalline silicon as a material of an active layer of a TFT. For example, Patent Document 1 describes a liquid crystal display device in which an active layer of a TFT is formed of an oxide semiconductor film of InGaZnO (oxide containing indium, gallium and zinc) or the like. Such a TFT is referred to as an "oxide semiconductor TFT".

The oxide semiconductor TFT is operable at a higher speed than an amorphous silicon TFT. The oxide semiconductor film is formed by a simpler process than a polycrystalline silicon film, and therefore, is applicable for a device which needs to have a large area size. The oxide semiconductor TFT is now being progressively used for a display device as a high performance active element that is produced with a smaller number of production steps and a lower production cost.

An oxide semiconductor has a high mobility. Therefore, the oxide semiconductor TFT provides performance of a level higher than, or equal to, that of a conventional amorphous silicon TFT even if having a smaller size. For this reason, in the case where the oxide semiconductor TFT is used, the ratio of area size of the TFT with respect to a pixel is decreased while the numerical aperture of the pixel is improved. This allows bright display to be provided even if the light amount of backlight is suppressed, and thus lowers power consumption.

For a compact and high-definition display device used for, for example, a smartphone or the like, it is not easy to improve the numerical aperture of the pixels because of the restriction on the minimum width of the lines (process rule) or the like. In such a situation, an oxide semiconductor TFT may be used to improve the numerical aperture of the pixels, so that high definition image display is provided with low power consumption even in a compact display device.

An oxide semiconductor TFT has a superb off-leak characteristic, and thus the pixel voltage is generally kept at a constant level even during a period in which the TFT is off. This allows use of an operation mode of decreasing the rewrite frequency for providing display. For example, the display device is made operable so as to rewrite image data at a frequency of once per second (1 Hz) for displaying a still image. Such a driving system, which is called an "off driving system" or a "low frequency driving system", significantly decreases the power consumption of the display device.

CITATION LIST

Patent Literature

Patent Document 1: Japanese Laid-Open Patent Publication No. 2012-134475
Patent Document 2: Japanese Laid-Open Patent Publication No. Hei 10-206823
Patent Document 3: Japanese Laid-Open Patent Publication No. 2007-121485

SUMMARY OF INVENTION

Technical Problem

It is known that when a liquid crystal panel is DC-driven, the liquid crystal material is deteriorated and a display fault such as burn-in or the like occurs. For this reason, a liquid crystal display device is usually AC-driven. More specifically, a liquid crystal display device is driven by a "frame inversion system", by which the polarity of the voltage to be applied to a liquid crystal layer is inverted on a frame-by-frame basis.

With the AC-driving, a pixel electrode is alternately supplied with a positive voltage, which is positive with respect to a counter voltage (counter electrode potential) Vcom to be applied to a counter electrode, and with a negative voltage, which is negative with respect to the counter voltage Vcom. For such driving, the counter voltage Vcom needs to be appropriately set so as to have a central level between the level of the positive voltage and the level of the negative voltage. Otherwise, even if a signal of the same absolute value is applied, display on the positive side and display on the negative side have different levels of luminance. Such a difference in luminance caused on a frame-by-frame basis is visually recognized as a flickering phenomenon of the display screen, namely, as "flicker".

It is known that repetition of blinking at a low frequency (e.g., 10 Hz) is more disturbing to human eyes than repetition of blinking at a high frequency. Therefore, in the case where a low frequency driving is performed by use of an oxide semiconductor TFT, even a frame-by-frame luminance change that is not visually recognized easily by conventional driving at 60 Hz is visually recognized as flicker easily. For this reason, a liquid crystal display device using an oxide semiconductor TFT is required to effectively suppress flicker.

For preventing flicker, it is necessary to set the counter voltage Vcom to an appropriate level. An appropriate level of the counter voltage Vcom is determined in consideration of a pull-in voltage ΔVd. The "pull-in voltage ΔVd" is a shift in the pixel voltage caused immediately after the TFT is turned off from an on-state, and is also called a "field-through voltage" or a "punch-through voltage".

Figure 10:
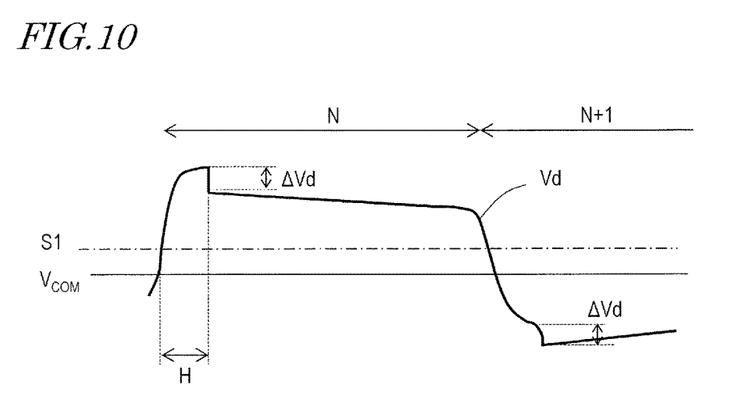
FIG. 10 shows a shift in the pixel voltage caused in the case where a frame inversion driving is performed.

FIG. 10 shows a shift in the level of the pixel voltage during AC-driving. As can be seen from FIG. 10, when a positive voltage is applied in a horizontal scanning period H in one frame (N'th frame) and then the TFT is put into an off-state, the level of the pixel voltage Vd is shifted to the negative side by a value of the pull-in voltage ΔVd. When a negative voltage of the same level is applied in the next frame, namely, the (N+1)th frame, the level of the pixel voltage Vd is shifted to the negative side by the pull-in voltage ΔVd, like when the positive voltage is applied.

As described above, due to the pull-in voltage ΔVd, the level of the pixel voltage Vd is shifted to the negative side regardless of the polarity of the source voltage. Therefore, the counter voltage Vcom is not set to central level S1 of a video signal, but is set to a level shifted from central level S1 to the negative side by the pull-in voltage ΔVd. In this manner, the positive-negative symmetrical state of voltages actually applied to the liquid crystal layer is compensated for. This suppresses the frame-by-frame change in luminance.

The pull-in voltage ΔVd is represented by, for example, the following expression.

$$\Delta Vd = Cgd \cdot (Vgh - Vgl)/(Clc + Ccs + Cgd + \alpha)$$

In the above expression, (Vgh−Vgl) is the difference between a scanning voltage when the TFT is on (Vgh) and a scanning voltage when the TFT is off (Vgl), namely, is the gate voltage amplitude. Clc is the liquid crystal capacitance, Ccs is the storage capacitance, Cgd is the gate-drain parasitic capacitance, and α is any other parasitic capacitance (including Cgd of the other pixels).

In the above expression, the gate-drain parasitic capacitance Cgd is of the case where the side connected with a signal line (data line) is the source of the TFT and the side connected with the pixel electrode is the drain of the TFT. In general, however, the source and the drain may be occasionally opposite to the above; namely, the side connected with the signal line may be referred to as the drain and the side connected with the pixel electrode may be referred to as the source. In this case, the gate-drain parasitic capacitance Cgd in the above expression corresponds to the gate-source parasitic capacitance Cgs.

As is clear from the above expression, the value of the pull-in voltage ΔVd significantly depends on the value of the gate-drain parasitic capacitance Cgd connected with the pixel electrode. Therefore, the optimal level of the counter voltage Vcom also varies in accordance with the value of the gate-drain parasitic capacitance Cgd.

In the meantime, there is a known technology for varying the channel width W or the channel length L of the TFT in accordance with the distance from the gate driver (e.g., Patent Document 2). In the case where the channel width W of a TFT provided in a pixel far from the gate driver is widened, delay of the display timing caused by delay of the scanning signal is alleviated.

However, when the channel width W of the TFT varies, the size of an overlapping area of the gate electrode and the drain electrode, namely, the value of the gate-drain parasitic capacitance Cgd also varies. In this case, the pull-in voltage ΔVd varies in accordance with the position of the pixel (distance from the gate driver). Therefore, for example, the level of the counter voltage Vcom that is set to be suitable to a pixel far from the gate driver may not be optimal for a pixel close to the gate driver.

In order to solve this problem, Patent Document 3 describes a technology for adjusting the level of the scanning voltage Vgh in a liquid crystal display device configured to increase the value of the parasitic capacitance Cgd of a TFT located far from the gate driver. Patent Document 3 describes that the method described therein prevents flicker in the entirely of a display region regardless of the distance from the gate driver.

However, studies made by the present inventors have found that when a display device including an oxide semiconductor TFT is driven for a long time, flicker is not fully suppressed by the conventional method, but is easily caused especially in a peripheral area of the panel.

The present invention, made to solve the above-described problem, has an object of, in a liquid crystal panel using an oxide semiconductor TFT, suppressing flicker in the entirely of a display region thereof.

Solution to Problem

A liquid crystal panel in an embodiment according to the present invention includes a pair of substrates; a liquid crystal layer provided between the pair of substrates; and a sealing member provided between the pair of substrates so as to surround the liquid crystal layer. The liquid crystal panel including a plurality of pixels provided in a matrix in a region surrounded by the sealing member. Each of the plurality of pixels includes an oxide semiconductor TFT provided in one substrate of the pair of substrates; and a pixel electrode provided in the one substrate and connected with the oxide semiconductor TFT. The each of the plurality of pixels is configured such that when the oxide semiconductor TFT is switched from an on-state to an off-state, a level of a voltage to be applied to the liquid crystal layer by use of the pixel electrode is shifted in a negative direction by a pull-in voltage ΔVd. A pull-in voltage ΔVd1 in a first pixel among the plurality of pixels is lower than a pull-in voltage ΔVd2 in a second pixel located farther from the sealing member than the first pixel.

In an embodiment, the liquid crystal panel further includes a first gate line connected with the first pixel, and a first adjacent gate line connected with a pixel adjacent to the first pixel and extending parallel to the first gate line; and a second gate line connected with the second pixel, and a second adjacent gate line connected with a pixel adjacent to the second pixel and extending parallel to the second gate line. An overlapping area of the pixel electrode of the first pixel and the first adjacent gate line is smaller than an overlapping area of the pixel electrode of the second pixel and the second adjacent gate line.

In an embodiment, the oxide semiconductor TFT included in the first pixel includes a channel having a width smaller than a width of a channel of the oxide semiconductor TFT included in the second pixel.

In an embodiment, a storage capacitance provided in the first pixel is larger than a storage capacitance of the second pixel.

In an embodiment, the first pixel is located near the sealing member, and the second pixel is located in a central area of the region surrounded by the sealing member.

In an embodiment, a third pixel located between the first pixel and the second pixel is provided. A pull-in voltage ΔVd3 in the third pixel is higher than the pull-in voltage ΔVd1 in the first pixel and is lower than the pull-in voltage ΔVd2 in the second pixel.

In an embodiment, the oxide semiconductor layer includes an In—Ga—Zn—O-based semiconductor layer.

In an embodiment, the In—Ga—Zn—O-based semiconductor layer includes a crystalline portion.

An active matrix substrate in an embodiment according to the present invention is usable in the above-described liquid crystal panel, and is the one substrate including the oxide semiconductor TFT and the pixel electrode.

Advantageous Effects of Invention

A liquid crystal panel in an embodiment according to the present invention suppresses flicker in the entirety of a display region thereof even when being driven for a long time by use of an oxide semiconductor TFT.

BRIEF DESCRIPTION OF DRAWINGS

FIG. 1(a) is a plan view and FIG. 1(b) is a cross-sectional view taken along line x-x' in FIG. 1(a).

FIG. 5(a) is a cross-sectional view and FIG. 5(b) is a plan view.

FIG. 6(a) is a cross-sectional view and FIG. 6(b) is a plan view.

FIG. 7(a) is a cross-sectional view and FIG. 7(b) is a plan view.

FIG. 8(a) through FIG. 8(d) each show a step.

FIG. 9(a) through FIG. 9(d) each show a step to be performed after the steps shown in FIG. 8(a) through FIG. 8(d).

DESCRIPTION OF EMBODIMENTS

Hereinafter, a liquid crystal panel in an embodiment according to the present invention will be described with reference to the drawings. In the following description, a liquid crystal panel operable in a vertical electric field mode (e.g., VA (Vertical Alignment) mode, TN (Twisted Nematic) mode, etc.) will be explained. The present invention is not limited to relating to such a liquid crystal panel, and the liquid crystal panel according to the present invention may be of a transverse electric field mode such as an FFS (Fringe Field Switching) mode.

FIG. 1(a) and FIG. 1(b) are respectively a plan view and a cross-sectional view (taken along line x-x') showing a liquid crystal panel 100 in an embodiment according to the present invention. The liquid crystal panel 100 has a structure in which a liquid crystal layer 40 is provided between a TFT substrate 10 and a counter substrate 30. The liquid crystal layer 40 is sealed between the TFT substrate 10 and the counter substrate 30 with a sealing member 42 provided around the liquid crystal layer 40.

Figure 1:
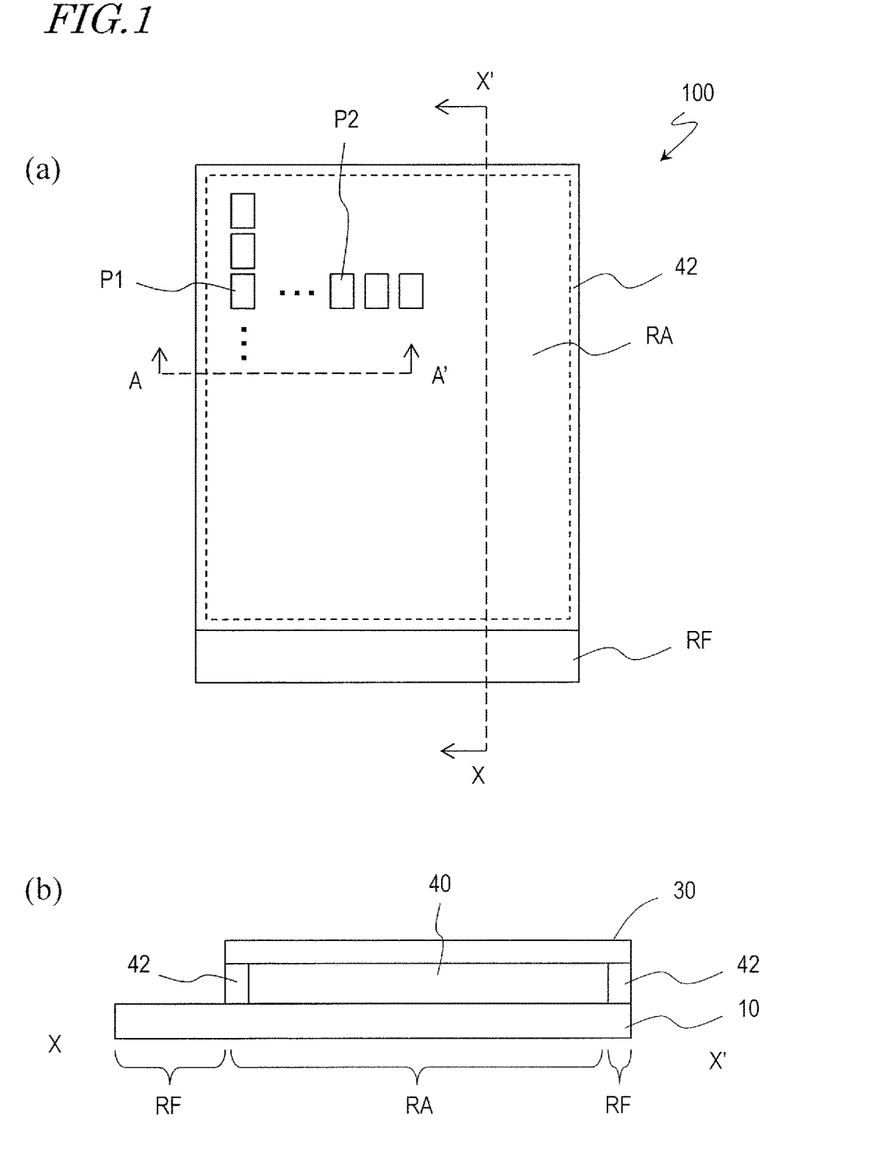
FIG. 1 shows a liquid crystal panel in an embodiment according to the present invention.

A region surrounded by the sealing member 42 is a display region (active area) RA usable for display, and a plurality of pixels P1 and P2 are provided in a matrix in the display region RA. Outer to the display region RA, a non-display region RF (occasionally referred to as a "frame region RF") having no pixel located therein is provided. In the frame region RF, for example, a terminal, a monolithic driver or the like is provided. In the liquid crystal panel 100 shown in the figures, a terminal region is provided in the frame region RF along a bottom side.

With such a structure, in a pixel P1 provided in the vicinity of the sealing member 42 (such a pixel will be occasionally referred to as a "peripheral pixel" or a "first pixel"), the level of a threshold voltage Vth of an oxide semiconductor TFT is easily shifted. A conceivable reason for this is that the liquid crystal layer 40 is contaminated with moisture or impurities via the sealing member 42. By contrast, in a pixel P2 provided in a central area of the display region RA (such a pixel will be occasionally referred to as a "central pixel" or a "second pixel"), the level of the threshold voltage Vth of the oxide semiconductor TFT is not shifted as easily as in the peripheral pixel P1.

The shift in the level of the threshold voltage Vth is caused in, for example, a step of annealing the oxide semiconductor TFT. The level of the threshold voltage Vth is also shifted by aging or a long-time operation. In this case, as the time passes, the difference between the shifting level of the threshold voltage Vth of the peripheral pixel P1 and the shifting level of the threshold voltage Vth of the central pixel P2 is enlarged. In this manner, the characteristics of the oxide semiconductor TFT of the peripheral pixel P1 and the characteristics of the oxide semiconductor TFT of the central pixel P2 are made different from each other. When this occurs, the optimal level of the counter voltage becomes significantly different for the peripheral pixel P1 and for the central pixel P2 after the liquid crystal panel is driven for a long time.

Figure 2:
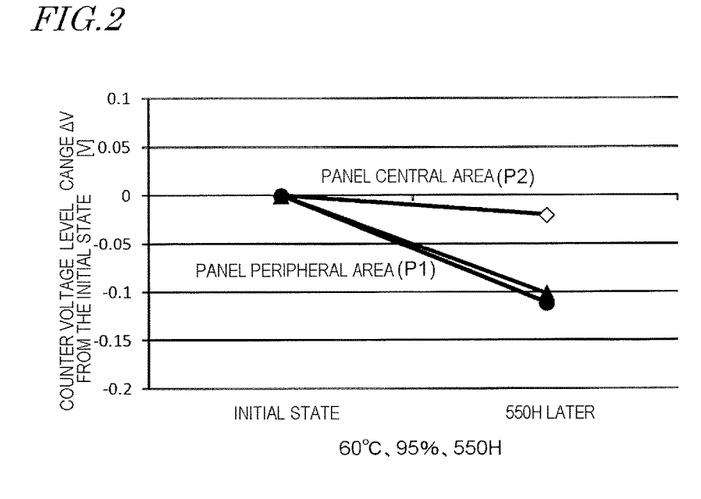
FIG. 2 shows a shift in the optimal level of the counter voltage in an aging test.

FIG. 2 shows an over-time shift in the optimal level of the counter voltage when an aging test was performed in which a liquid crystal panel was operated for 550 hours at a temperature of 60° C. and a humidity of 95%. As can be seen from FIG. 2, the over-time shift in the optimal level of the counter voltage for the pixel P2 in the central area of the panel is relatively small. By contrast, the over-time shift in the optimal level of the counter voltage for the pixel P1 in the peripheral area of the panel is relatively large. Therefore, after the liquid crystal panel is driven for a long time, the level of the counter voltage to be applied to the pixel P1 in the peripheral area of the panel is lower than the level of the counter voltage to be applied to the pixel P2 in the central area of the panel.

In this situation, the present inventors conceived forming the peripheral pixel P2 and the central pixel P1 with different structures such that the optimal level of the counter voltage for the peripheral pixel P1 is higher in an initial state. More specifically, plurality of pixels are configured such that a pull-in voltage ΔVd1 in the peripheral pixel P1 is lower than a pull-in voltage ΔVd2 in the central pixel P2, so that in the initial state, the optimal level of the counter voltage for the peripheral pixel P1 is higher than the optimal level of the counter voltage for the central pixel P2. It has been found that with such an arrangement, even when the optimal level of the counter voltage for the peripheral pixel P1 is shifted to the negative side relatively largely as a result of the liquid crystal panel being driven for a long time, flicker is suppressed in the entirety of the display region.

Figure 3:
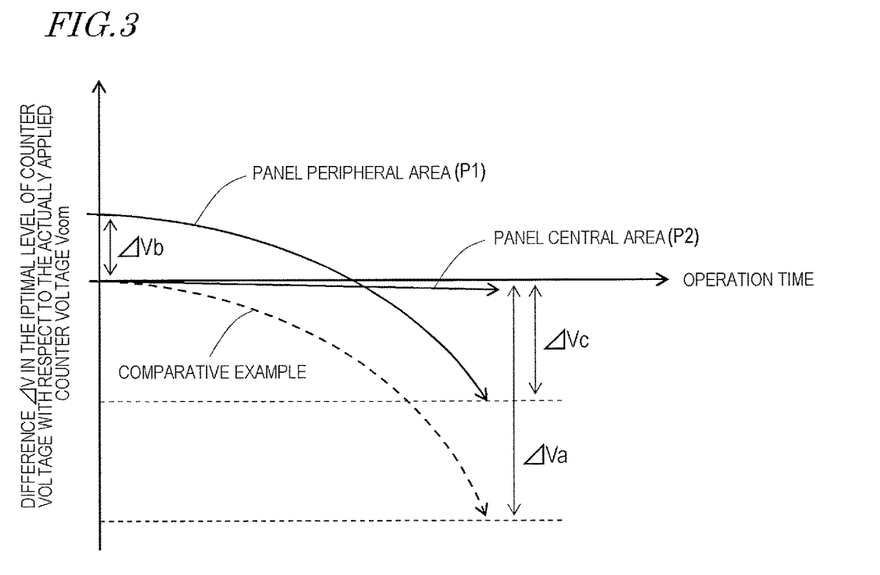
FIG. 3 shows a shift in the optimal level of the counter voltage with respect to the operation time.

FIG. 3 shows a shift in the optimal level of the counter voltage with respect to the operation time in the liquid crystal panel in this embodiment and a liquid crystal panel in a conventional example. In this embodiment, the optimal level of the counter voltage for the peripheral pixel P1 is set to be higher than the optimal level of the counter voltage for the central pixel P2 in the initial state. By contrast, in the comparative example represented by the dashed line, the optimal level of the counter voltage is set to be equal for a peripheral pixel and for a central pixel in the initial state.

As can be seen from FIG. 3, the pixels are configured such that in the initial state, the optimal level of the counter voltage for the peripheral pixel P1 is higher by ΔVb than the optimal level of the counter voltage for the central pixel P2. Therefore, even after a long-time operation, the difference between the optimal level of the counter voltage for the peripheral pixel P1 and the level of the actually applied counter voltage Vcom (typically, set to be equal to the optimal level of the counter voltage for the central pixel P2) is merely ΔVc as shown in the figure. In the comparative example, in which the optimal level of the counter voltage in the initial state is set to be equal for the peripheral pixel and for the central pixel, the difference caused after a long-time operation between the optimal level of the counter voltage for the peripheral pixel and the level of the actually applied counter voltage Vcom is ΔVa. ΔVc is sufficiently smaller than ΔVa. The above-described differences ΔVb, ΔVc and ΔVa fulfill the relationship of ΔVa=ΔVb+ΔVc.

In this manner, the optimal level of the counter voltage for the peripheral pixel P1 is set to be higher in the initial state (namely, the level of the actually applied counter voltage Vcom that is set based on the central pixel P2 is lower than the optimal level for the peripheral pixel P1). As a result, flicker is suppressed in the entirety of the display region after a long-time operation (e.g., operation for 5,000 hours to 10,000 hours).

It should be noted that in order to suppress flicker in the peripheral pixel P1 in the initial state, it is preferable that the difference ΔVb between the optimal levels of the counter voltage is set to an appropriate value so as not to be excessively large. The difference ΔVb may be appropriately set in accordance with the degree of change in the characteristics of the oxide semiconductor TFT in the peripheral pixel P1, and is set to, for example, about 100 mV or smaller. In the case where the difference ΔVb is relatively small, a slight luminance change on a frame-by-frame basis is not visually recognized as flicker, and thus a good display quality is realized from the initial state in the peripheral area of the liquid crystal panel.

Figure 4:
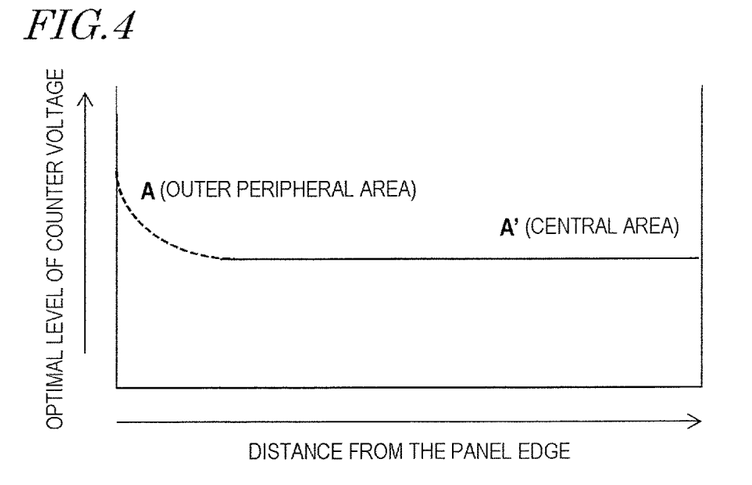
FIG. 4 shows a difference in the optimal level of the counter voltage in accordance with the position of the pixel.

FIG. 4 shows an optimal level of the counter voltage in the initial state, with which flicker in the peripheral area is suppressed after a long-time operation. As can be seen from FIG. 4, it is preferable that the optimal level of the counter voltage is set to be higher in the peripheral area (outer peripheral area) than in the central area. As described above, in the case where the pull-in voltage ΔVd1 in the peripheral pixel P1 is lower than the pull-in voltage ΔVd2 in the central pixel P2, the optimal level of the counter voltage for the peripheral pixel P1 is higher. The pull-in voltage ΔVd1 may be decreased by, for example, decreasing the value of the gate-drain parasitic capacitance Cgd or increasing the value of the storage capacitance Cs as described below in detail in embodiments 1 through 3.

FIG. 4 is regarding an area corresponding to line A-A' in FIG. 1. The relationship of the optimal level of the counter voltage between the outer peripheral area and the central area as shown in FIG. 4 is applicable to each of the four sides of the liquid crystal panel 100. Namely, in the liquid crystal panel 100, the pixels are configured such that the optimal level of the counter voltage for an arbitrary pixel P1 positionally close to the sealing member 42 surrounding the liquid crystal layer 40 is relatively high in the initial state (namely, such that the pull-in voltage ΔV1 is relatively low).

Hereinafter, embodiments will be described in more detail.

Embodiment 1

Figure 5:
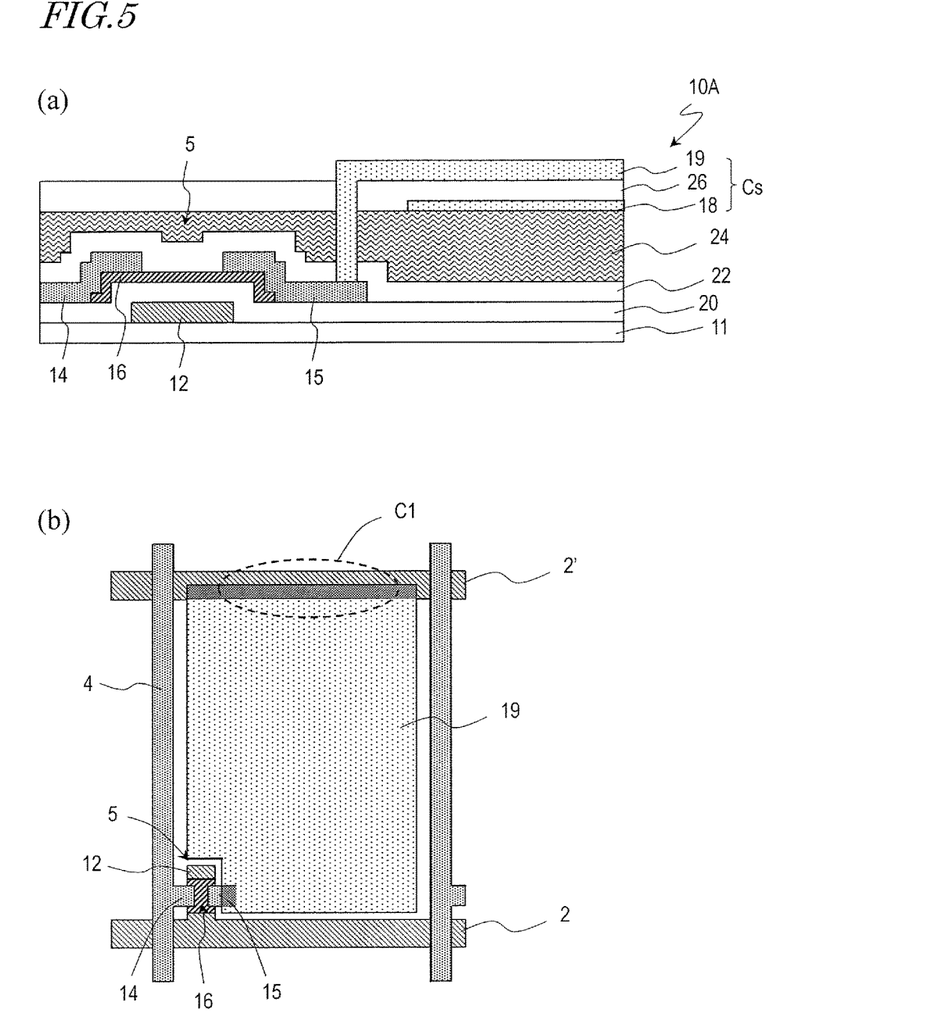
FIG. 5 shows an area, corresponding to one pixel, of a TFT substrate included in a liquid crystal panel in embodiment 1.

FIG. 5(*a*) and FIG. 5(*b*) are respectively a cross-sectional view and a plan view showing an area, corresponding to one pixel, of a TFT substrate 10A included in a liquid crystal panel in embodiment 1.

As shown in FIG. 5(*a*) and FIG. 5(*b*), the TFT substrate 10A includes a transparent insulating plate 11, a gate line 2 extending in a horizontal direction, a source line 4 extending in a direction crossing the gate line 2 (typically, direction perpendicular to the gate line 2), and a TFT 5 connected with the gate line 2 and the source line 4. The gate line 2, the source line 4 and the TFT 5 are provided on the transparent insulating plate 11.

The TFT 5 includes a gate electrode 12 connected with the gate line 2, a gate insulating layer 20 covering the gate electrode 12, an oxide semiconductor layer 16, typically of an island shape, provided on the gate insulating electrode 12 with the gate insulating layer 20 being provided therebetween, and a source electrode 14 and a drain electrode 15 both electrically connected with the oxide semiconductor layer 16. The source electrode 14 is connected with the source line 4. The source electrode 14 and the drain electrode 15 are located to be separated from each other above the gate electrode 12. With this structure, when an on-voltage is applied to the gate electrode 12, the TFT 5 is put into an on-state, and the source electrode 14 and the drain electrode 15 become electrically conductive to each other via a channel formed of the oxide semiconductor layer 16.

The TFT substrate 10A also includes a passivation layer 22 formed of an inorganic insulating film and provided so as to cover the TFT 5, and a flattening layer 24 formed of an organic insulating film. Provided on the flattening layer 24 are a transparent CS electrode 18 formed of ITO (indium tin oxide), IZO (indium zinc oxide) or the like, a transparent insulating layer 26 formed of an inorganic insulating film, and a pixel electrode 19 formed of ITO or IZO.

The pixel electrode 19 is electrically connected with the drain electrode 15 of the TFT 5 via a contact hole running through the passivation layer 22, the flattening layer 24 and the transparent insulating layer 26. The transparent CS electrode 18 is electrically insulated from the pixel electrode 19, and is configured to, for example, be supplied with a voltage of the same level as that of the counter voltage to be applied to a counter electrode (not shown) provided in a counter substrate 30 (see FIG. 1). With this structure, the pixel electrode 19, the transparent CS electrode 18 and the transparent insulating layer 26 provided between the pixel electrode 19 and the transparent CS electrode 18 form a storage capacitance Cs. When the TFT is in an on-state, charges are accumulated in the storage capacitance Cs and are used to maintain the potential of the pixel electrode while the TFT is in an off-state.

In a liquid crystal panel of an FFS mode, the pixel electrode 19 may have a plurality of lengthy electrode portions and slits, and the transparent CS electrode 18 may be used as a counter electrode to generate a transverse electric field or an oblique electric field between the transparent CS electrode 18 and the pixel electrode 19. In this case, the counter substrate 30 does not need to include a counter electrode.

Now, a difference between the structure of the peripheral pixel P1 located in the vicinity of the sealing member 42 and the structure of the central pixel P2 in the central area of the panel as shown in FIG. 1 will be described.

In FIG. 5(b), area C1 surrounded by the dashed line is an overlapping area of the pixel electrode 19 and an adjacent gate line 2'. The "adjacent gate line 2'" is a gate line provided for a pixel adjacent to the pixel of interest. The value of the gate-drain parasitic capacitance Cgd varies in accordance with the size of the overlapping area of the adjacent gate line 2' and the pixel electrode 19.

The pixels are configured such that in area C1, the overlapping area of the pixel electrode 19 of the peripheral pixel P1 and the adjacent gate line 2' is relatively small. The pixels are also configured such that the overlapping area of the pixel electrode 19 of a pixel far from the sealing member 42 (or far from an edge of the display region RA) and the adjacent gate line 2' is relatively large. Namely, the overlapping area is set to be larger for the central pixel P2 than for the peripheral pixel P1.

The size of the overlapping area may be adjusted by, for example, forming the pixel electrode 19 of the peripheral pixel P1 and the pixel electrode 19 of the central pixel P2 with different shapes. Specifically, the pixel electrode 19 of the peripheral pixel P1 may be formed so as to have a small overlapping area with the adjacent gate line 2'. With such a method, the value of the gate-drain parasitic capacitance is adjusted without the pixels being formed to have different values of the numerical aperture. Any of various other structures may be used. For example, the gate line 2 may be formed to be thinner in the peripheral area of the panel than in the central area of the panel.

In this manner, the overlapping area of the pixel electrode 19 and the adjacent gate line 2' is made larger as being farther from the frame region RF or the sealing member 42 of the liquid crystal panel (see FIG. 1). Thus, the pull-in voltage ΔVd1 in the peripheral pixel P1 is lower than the pull-in voltage ΔVd2 in the central pixel P2. Therefore, in the initial state, the optimal level of the counter voltage for the peripheral pixel P1 is higher than the optimal level of the counter voltage for the central pixel P2. As a result, a state where flicker is suppressed in the peripheral area after a long-time operation as shown in FIG. 4 is realized.

The above-described description is made on two pixels, namely, the peripheral pixel P1 and the central pixel P2. The value of the gate-drain parasitic capacitance of each of the pixels may be adjusted such that the pull-in voltage ΔVd is varied step by step from the peripheral area to the central area of the panel. In this case, a pull-in voltage ΔVd3 in a pixel located between the peripheral pixel P1 and the central pixel P2 (for example, a pixel located slightly closer to the central area of the panel than the peripheral pixel P1) is set to be higher than the pull-in voltage ΔVd1 in the peripheral pixel P1 and to be lower than the pull-in voltage ΔVd2 in the central pixel P2.

Embodiment 2

Figure 6:
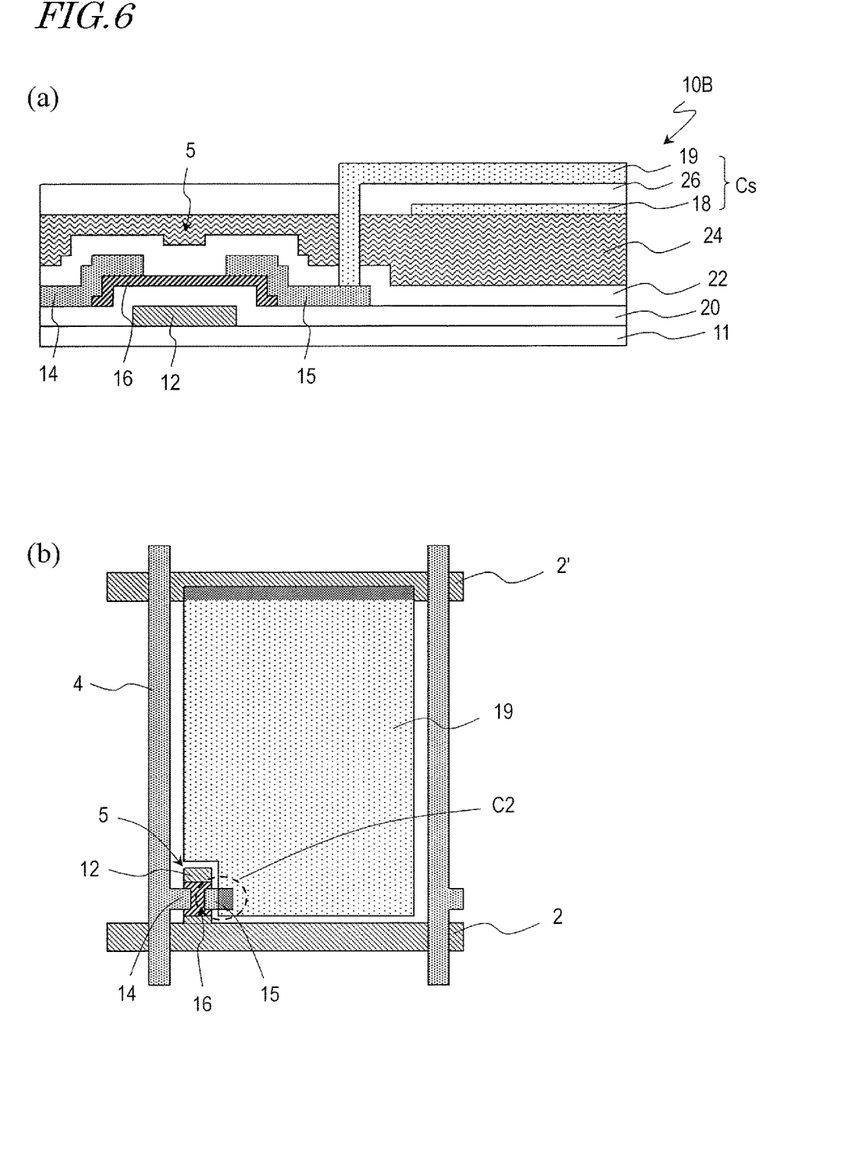
FIG. 6 shows an area, corresponding to one pixel, of a TFT substrate included in a liquid crystal panel in embodiment 2.

FIG. 6(a) and FIG. 6(b) are respectively a cross-sectional view and a plan view showing an area, corresponding to one pixel, of a TFT substrate 10B included in a liquid crystal panel in embodiment 2. For the sake of simplicity, the same elements as those in embodiment 1 will bear the identical reference signs thereto and the descriptions thereof will be omitted.

Also in the TFT substrate 10B in this embodiment, the pixels are configured such that the pull-in voltage ΔVd1 in the peripheral pixel P1 is lower than the pull-in voltage ΔVd2 in the central pixel P2. More specifically, in area C2 surrounded by the dashed line in FIG. 6(b), the TFT 5 in the peripheral area of the panel is designed to have a smaller channel width (width of the drain electrode 15), so that the value of the gate-drain parasitic capacitance Cgd of the peripheral pixel P1 is smaller than the value of the gate-drain parasitic capacitance Cgd of the central pixel P2.

The value of the gate-drain parasitic capacitance Cgd of the TFT 5 is smaller as an overlapping area of the drain electrode 15 and the gate electrode 12 is smaller. Therefore, the width of the drain electrode 15 is set to be smaller in the peripheral pixel P1 than in the central pixel P2, so that the value of the gate-drain parasitic capacitance Cgd is smaller, namely, the pull-in voltage ΔVd1 is lower, in the peripheral pixel P1.

The size of the overlapping area of the gate electrode and the drain electrode 15 may be varied by any other arrangement. For example, the width of the gate electrode 12 may be made smaller in the peripheral pixel P1, so that the overlapping area is smaller and thus the value of the parasitic capacitance Cgd is smaller in the peripheral pixel P1 than in the central pixel P2.

In this manner, the channel width of the TFT 5 (or the overlapping area of the gate electrode 12 and the drain electrode 15) is made larger as being farther from the frame region RF or the sealing member 42 of the liquid crystal panel (see FIG. 1). Thus, the pull-in voltage ΔVd1 in the TFT in the peripheral area of the panel is lower. Therefore, in the initial state, the optimal level of the counter voltage for the peripheral pixel P1 is higher than the optimal level of the counter voltage for the central pixel P2. As a result, a state where flicker is suppressed in the peripheral area after a long-time operation as shown in FIG. 4 is realized.

Embodiment 3

Figure 7:
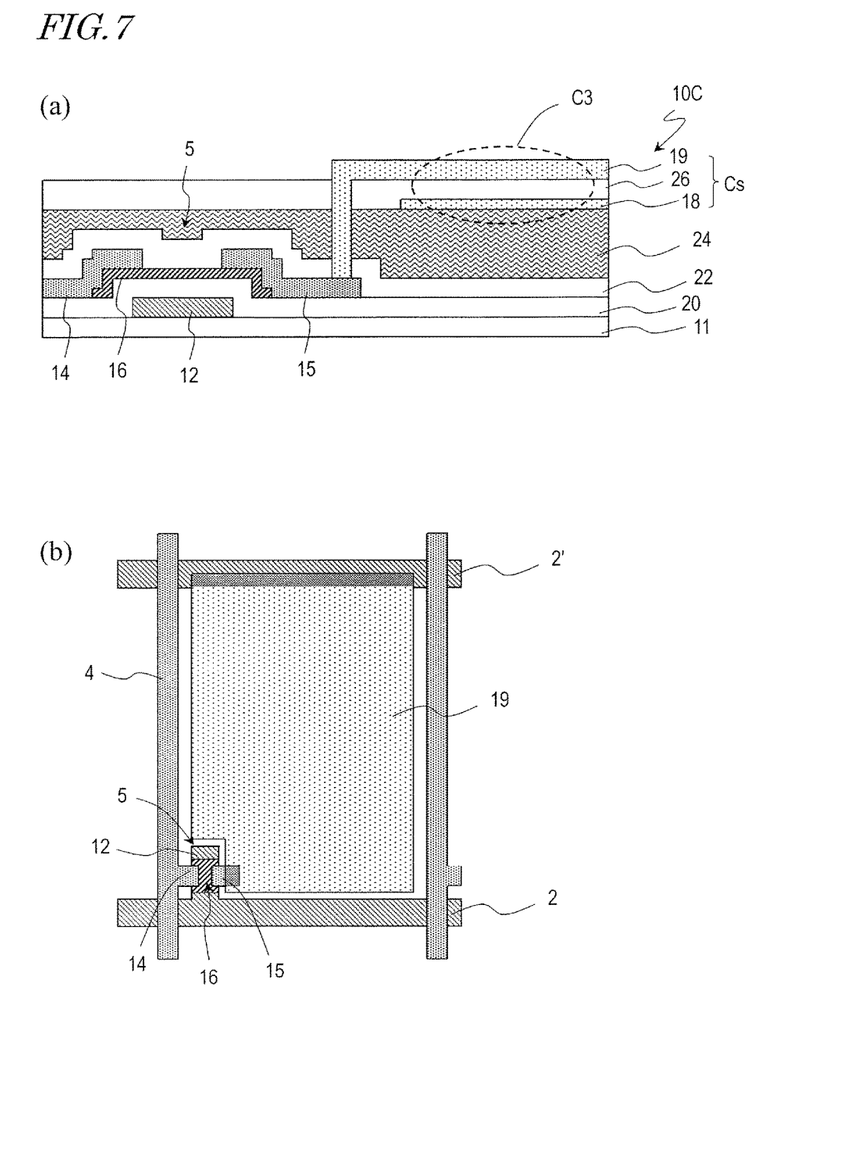
FIG. 7 shows an area, corresponding to one pixel, of a TFT substrate included in a liquid crystal panel in embodiment 3.

FIG. 7(a) and FIG. 7(b) are respectively a cross-sectional view and a plan view showing an area, corresponding to one pixel, of a TFT substrate 10C included in a liquid crystal panel in embodiment 3. For the sake of simplicity, the same elements as those in embodiments 1 and 2 will bear the identical reference signs thereto and the description thereof will be omitted.

Also in the TFT substrate 10C in this embodiment, the pixels are configured such that the pull-in voltage ΔVd1 in the peripheral pixel P1 is lower than the pull-in voltage ΔVd2 in the central pixel P2. More specifically, in area C3 surrounded by the dashed line in FIG. 7(b), the value of the storage capacitance Cs of the peripheral pixel P1 is set to be larger than the value of the storage capacitance Cs of the central pixel P2.

With such a structure, the peripheral pixel P1 having a relatively large value of the storage capacitance Cs is less influenced by the parasitic capacitance (Cgd) than the central pixel P2 having a relatively small value of the storage capacitance Cs. For this reason, the pull-in voltage ΔVd1 is lower in the peripheral pixel P1. Thus, the optimal level of the counter voltage for the peripheral pixel P1 is higher than the optimal level of the counter voltage for the central pixel P2.

The value of the storage capacitance Cs may be adjusted by, for example, varying the size of an overlapping area of the pixel electrode 19 and the transparent CS electrode 18. The transparent CS electrode 18 is, for example, provided to expand in the entirety of the display region to be common to the plurality of pixels. The transparent CS electrode 18 is formed to have an opening in an area including the TFT 5 and a contact area of the pixel electrode 19 and the drain electrode 15 (around the contact hole) of each pixel. The opening of the peripheral pixel P1 may be formed to be smaller than the opening of the central pixel P2, so that the overlapping area of the transparent CS electrode 18 and the pixel electrode 19 is larger and thus the value of the storage capacitance Cs is larger in the peripheral pixel P1.

Alternatively, the value of the storage capacitance Cs may be made relatively large by a structure in which the transparent insulating layer 26 provided between the pixel electrode 19 and the transparent CS electrode 18 is made thinner in the peripheral pixel P1 than in the central pixel P2.

In this manner, the value of the storage capacitance Cs of the pixel is made smaller as being farther from the frame region RF or the sealing member 42 of the liquid crystal panel (see FIG. 1). Thus, the pull-in voltage $\Delta Vd1$ in the TFT is lower in the peripheral area of the panel. Therefore, in the initial state, the optimal level of the counter voltage for the peripheral pixel P1 is higher than the optimal level of the counter voltage for the central pixel P2. As a result, a state where flicker is suppressed in the peripheral area after a long-time operation as shown in FIG. 4 is realized.

Embodiment 4

Figure 8:
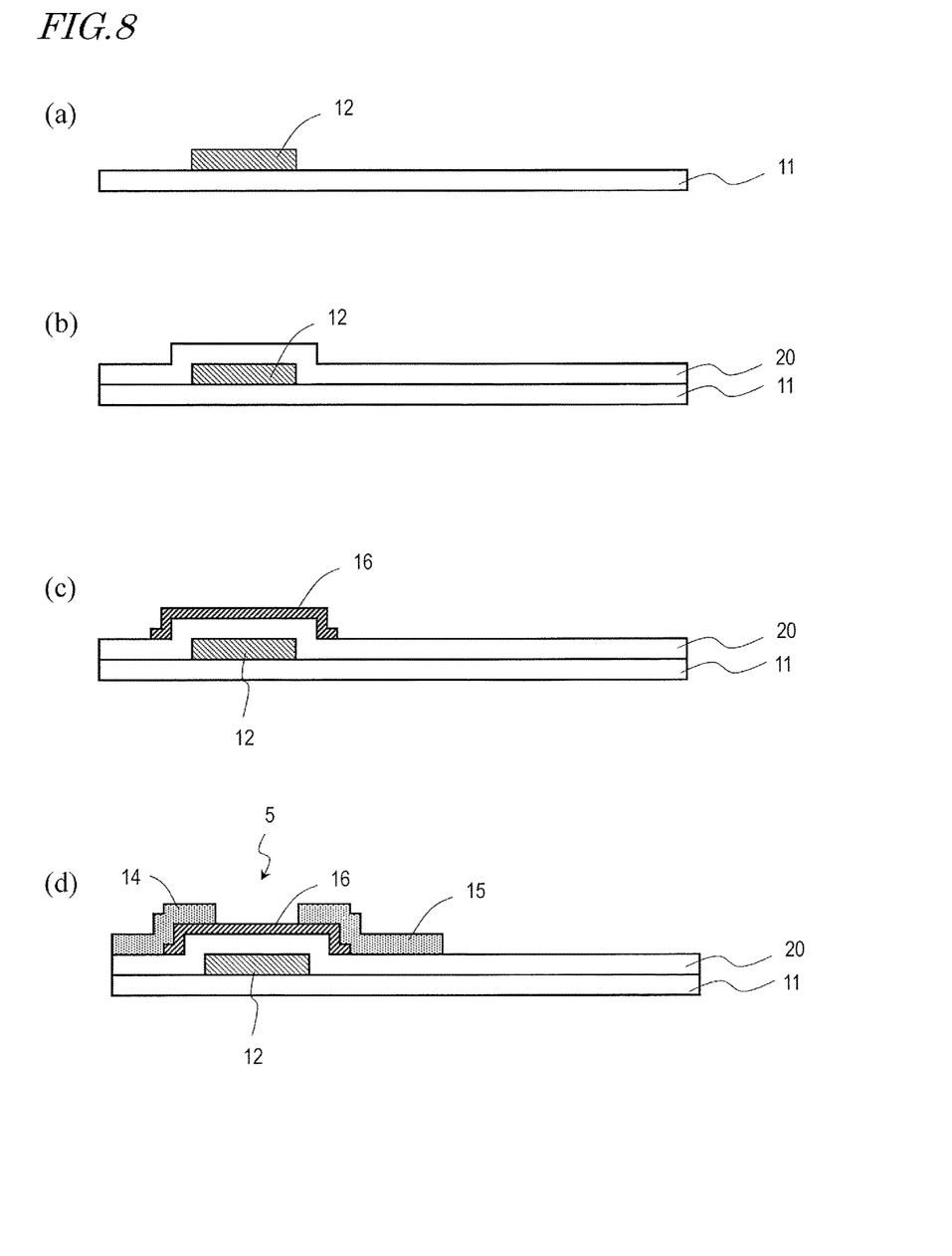
FIG. 8 includes cross-sectional views showing a method for producing a TFT substrate included in a liquid crystal panel in an embodiment according to the present invention.
Figure 9:
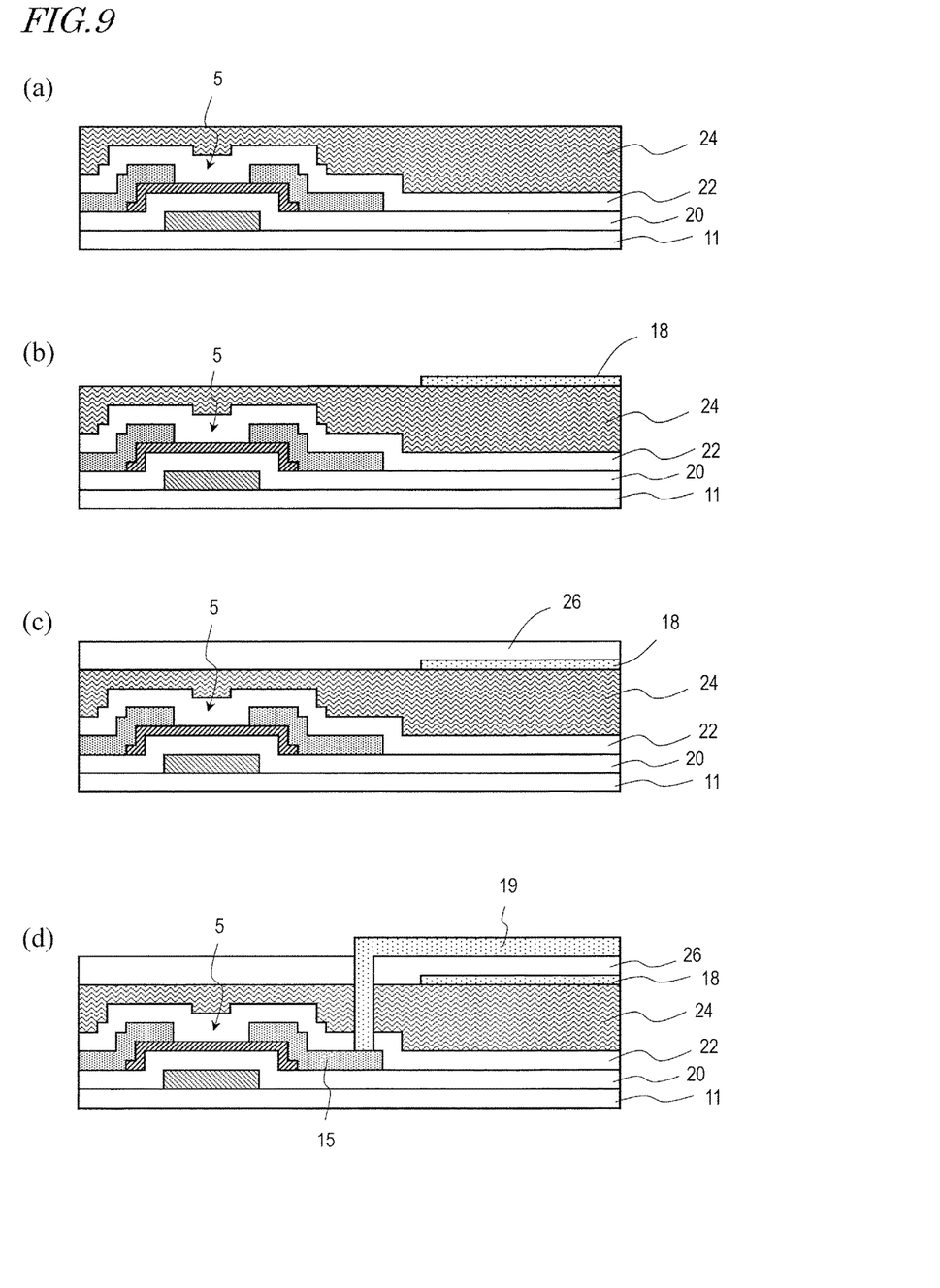
FIG. 9 includes cross-sectional views showing the method for producing the TFT substrate included in the liquid crystal panel in the embodiment according to the present invention.

Hereinafter, with reference to FIG. 8 and FIG. 9, a method for producing an active matrix substrate included in the liquid crystal panel in each of embodiments 1 through 3 will be described.

First, as shown in FIG. 8(a), the gate electrode 12, the gate line 2 (see FIG. 5, etc.) and the like are formed on the transparent insulating plate 11 of glass, a plastic material or the like. In this step, for example, a stacked film including a Ti film and an Al film is formed by sputtering and is patterned by photolithography. A metal film that is to be the gate electrode 12 and the like may be, for example, a three-layer film including a lower layer of Ti, a middle layer of Al and an upper layer of Ti, or a single layer film, a stacked film, an alloy film or the like formed of Ti, Mo, Ta, W, Cu or the like.

Then, as shown in FIG. 8(b), the gate insulating layer 20 formed of an inorganic material such as a silicon oxide film, a silicon nitride film, a silicon oxide nitride film, a stacked film including such films or the like is formed by CVD.

Then, as shown in FIG. 8(c), the oxide semiconductor layer 16 is formed as follows, for example. An In—Ga—Zn—O-based semiconductor film is formed by sputtering and is patterned by photolithography, such that the semiconductor layer of an island shape is formed in an area acting as a channel of the TFT 5 (FIG. 8(d)).

The In—Ga—Zn—O-based semiconductor is a three-component oxide of In (indium), Ga (gallium) and Zn (zinc). The ratio (composition ratio) of In, Ga and Zn is set to, for example, In:Ga:Zn=1:1:1. The composition ratio is not limited to this, and may be, for example, In:Ga:Zn=2:2:1, In:Ga:Zn=1:1:2, or the like.

A TFT including an In—Ga—Zn—O-based semiconductor layer has a high mobility (more than 20 times as high as that of an a-Si TFT) and a low leak current (less than 1/100 of that of an a-Si TFT), and therefore, is preferably usable as a driving TFT or a pixel TFT. Use of a TFT including the In—Ga—Zn—O-based semiconductor layer significantly decreases the power consumption of the display device.

The In—Ga—Zn—O-based semiconductor may be amorphous or may contain a crystalline portion. A preferable crystalline In—Ga—Zn—O-based semiconductor has a c-axis aligned generally perpendicularly to the layer surface. A crystalline structure of such an In—Ga—Zn—O-based semiconductor is disclosed in, for example, Japanese Laid-Open Patent Publication No. 2012-134475 (Patent Document 1). The disclosure of Japanese Laid-Open Patent Publication No. 2012-134475 is incorporated herein in its entirety by reference.

The oxide semiconductor layer 16 may contain any other oxide semiconductor instead of the In—Ga—Zn—O-based semiconductor. The oxide semiconductor layer 16 may contain, for example, a Zn—O-based semiconductor (ZnO), an In—Zn—O-based semiconductor (IZO (registered trademark)), a Zn—Ti—O-based semiconductor (ZTO), a Cd—Ge—O-based semiconductor, a Cd—Pb—O-based semiconductor, CdO (cadmium oxide), an Mg—Zn—O-based semiconductor, an In—Sn—Zn—O-based semiconductor (e.g., $In_2O_3$—$SnO_2$—ZnO), an In—Ga—Sn—O-based semiconductor, an In—Ga—O-based semiconductor, or the like.

Then, as shown in FIG. 8(d), the source line (not shown), the source electrode 14, the drain electrode 15 and the like are formed. More specifically, a metal layer formed of Ti/Al/Ti (or Mo) that is to be the source and drain lines is formed by sputtering and is patterned into lines and electrodes. Thus, the source electrode 14, the drain electrode 15 and the like are formed. As a result, the oxide semiconductor TFT 5 of a bottom gate type is obtained.

As described in embodiment 2, in the case where the channel width of the TFT of the peripheral pixel P1 is made different from that of the central pixel P2, the patterning in the step of forming the drain electrode 15 may be performed by use of an appropriate mask such that the width of the drain electrode 15 is smaller in the peripheral pixel P1.

Then, as shown in FIG. 9(a), the passivation layer 22 and the flattening layer 24 are formed on the oxide semiconductor TFT 5. More specifically, the passivation layer 22 is formed by CVD of a silicon oxide film, a silicon nitride film, a silicon oxide nitride film or a stacked film including such films. On the passivation layer 22, the flattening layer 24 is formed of a photosensitive resin material.

Then, as shown in FIG. 9(b), the transparent CS electrode (common electrode) 18 is formed as follows on the flattening layer 24. An ITO film or an IZO film is formed by sputtering and is patterned by photolithography.

The transparent CS electrode 18 is typically formed to have an opening in an area corresponding to an extended part of the TFT 5 and the drain electrode 15 (area where the contact hole is to be formed later). The transparent CS electrode 18 may be formed to expand in the entirety of the panel to be common to the plurality of pixels, except for the opening. Alternatively, one transparent CS electrode 18 may be provided for each of the plurality of pixels independently.

As described in embodiment 3, in the case where the value of the storage capacitance Cs of the peripheral pixel P1 is made different from that of the central pixel P2, the patterning in the step of forming the transparent CS electrode 18 may be performed by use of an appropriate mask such that the opening is smaller in the peripheral pixel P1 (namely, such that the size of the overlapping area of the transparent CS electrode 18 and the pixel electrode 19 is larger in the peripheral pixel P1).

Then, as shown in FIG. 9(c), the transparent insulating film 26 covering the transparent CS electrode 18 is formed as follows. An insulating film such as a silicon oxide film, a silicon nitride film, a silicon oxide nitride film or a stacked film including such films is formed by CVD.

Then, as shown in FIG. 9(d), the pixel electrode 19 is formed on the transparent insulating film 26 as follows. After the contact hole exposing the contact area of the drain electrode 15 is formed, an ITO film, an IZO film or a ZnO film is formed by sputtering and is patterned by photolithography.

As described in embodiment 1, in the case where the value of the parasitic capacitance between the pixel electrode 19 and the adjacent gate line 2' is made different for the peripheral pixel P1 from that for the central pixel P2, the patterning in the step of forming the pixel electrode 19 may be performed by use of an appropriate mask such that the overlapping area of the pixel electrode 19 of the peripheral pixel P1 and the adjacent gate line 2' is smaller.

So far, embodiments the present invention have been described. Needless to say, various modifications are possible. For example, the above-described TFT is of a bottom gate type, in which the gate electrode 12 is located below the oxide semiconductor layer 16. Alternatively, the TFT may be of a top gate type, in which the gate electrode 12 is located above the oxide semiconductor layer 16. A protective layer preventing etching damage on the oxide semiconductor layer 16 in the step of forming the source and drain electrodes may be provided on the oxide semiconductor layer 16. Needless to say, the elements of embodiments 1 through 3 may be combined.

INDUSTRIAL APPLICABILITY

A liquid crystal panel in an embodiment according to the present invention is widely usable for various display devices and electronic devices such as TVs, monitors, displays for mobile terminals, and the like.

REFERENCE SIGNS LIST

2 Gate line
4 Source line
5 Oxide semiconductor TFT
10, 10A, 10B, 10C TFT substrate
11 Transparent plate
12 Gate electrode
14 Source electrode
15 Drain electrode
16 Oxide semiconductor layer
18 Transparent CS electrode
19 Pixel electrode
20 Gate insulating layer
22 Passivation layer
24 Organic insulating layer
26 Transparent insulating layer
30 Counter substrate
40 Liquid crystal layer
42 Sealing member
100 Liquid crystal panel
RF Non-display region (frame region)
RA Display region (active area)
P1 Peripheral pixel (first pixel)
P2 Central pixel (second pixel)

The invention claimed is:

1. A liquid crystal panel, comprising:
a pair of substrates;
a liquid crystal layer provided between the pair of substrates; and
a sealing member provided between the pair of substrates so as to surround the liquid crystal layer;
the liquid crystal panel including a plurality of pixels provided in a matrix in a region surrounded by the sealing member;
wherein:
each of the plurality of pixels includes:
an oxide semiconductor TFT provided in one substrate of the pair of substrates; and
a pixel electrode provided in the one substrate and connected with the oxide semiconductor TFT;
the each of the plurality of pixels is configured such that when the oxide semiconductor TFT is switched from an on-state to an off-state, a level of a voltage to be applied to the liquid crystal layer by use of the pixel electrode is shifted in a negative direction by a pull-in voltage $\Delta Vd$; and
a pull-in voltage $\Delta Vd1$ in a first pixel among the plurality of pixels is lower than a pull-in voltage $\Delta Vd2$ in a second pixel located farther from the sealing member than the first pixel.

2. The liquid crystal panel according to claim 1, further comprising:
a first gate line connected with the first pixel, and a first adjacent gate line connected with a pixel adjacent to the first pixel and extending parallel to the first gate line; and
a second gate line connected with the second pixel, and a second adjacent gate line connected with a pixel adjacent to the second pixel and extending parallel to the second gate line;
wherein an overlapping area of the pixel electrode of the first pixel and the first adjacent gate line is smaller than an overlapping area of the pixel electrode of the second pixel and the second adjacent gate line.

3. The liquid crystal panel according to claim 1 or 2, wherein the oxide semiconductor TFT included in the first pixel includes a channel having a width smaller than a width of a channel of the oxide semiconductor TFT included in the second pixel.

4. The liquid crystal panel according to claim 1, wherein a storage capacitance provided in the first pixel is larger than a storage capacitance of the second pixel.

5. The liquid crystal panel according to claim 1, wherein the first pixel is located near the sealing member, and the second pixel is located in a central area of the region surrounded by the sealing member.

6. The liquid crystal panel according to claim 1, comprising a third pixel located between the first pixel and the second pixel, wherein a pull-in voltage $\Delta Vd3$ in the third pixel is higher than the pull-in voltage $\Delta Vd1$ in the first pixel and is lower than the pull-in voltage $\Delta Vd2$ in the second pixel.

7. The liquid crystal panel according to claim 1, wherein the oxide semiconductor layer includes an In—Ga—Zn—O-based semiconductor layer.

8. The liquid crystal panel according to claim 7, wherein the In—Ga—Zn—O-based semiconductor layer includes a crystalline portion.

9. An active matrix substrate usable in the liquid crystal panel according to claim 1, the active matrix substrate being the one substrate including the oxide semiconductor TFT and the pixel electrode.

* * * * *